United States Patent
Aleyt et al.

(10) Patent No.: US 7,495,408 B2
(45) Date of Patent: Feb. 24, 2009

(54) METHOD FOR THE NO-TRANSMITTER SPEED DETERMINATION OF AN ASYNCHRONOUS MACHINE

(75) Inventors: Christian Aleyt, Hamburg (DE); Nils-Peter Hansen, Kiel (DE); Frank Hormann, Westensee (DE); Torsten Hunte, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 261 days.

(21) Appl. No.: 11/488,488

(22) Filed: Jul. 18, 2006

(65) Prior Publication Data

US 2007/0018603 A1 Jan. 25, 2007

(30) Foreign Application Priority Data

Jul. 21, 2005 (DE) .................. 10 2005 034 243

(51) Int. Cl.
G05B 11/36 (2006.01)
(52) U.S. Cl. .................. 318/609; 318/700; 388/911
(58) Field of Classification Search .................. 318/138, 318/254, 609; 388/911
See application file for complete search history.

(56) References Cited

U.S. PATENT DOCUMENTS

| | | | | | |
|---|---|---|---|---|---|
| 5,998,946 | A | * | 12/1999 | Kim | 318/400.32 |
| 6,163,127 | A | * | 12/2000 | Patel et al. | 318/700 |
| 6,552,509 | B2 | * | 4/2003 | Veltman | 318/807 |
| 6,831,439 | B2 | * | 12/2004 | Won et al. | 318/701 |
| 7,026,772 | B2 | * | 4/2006 | Quirion | 318/400.02 |
| 2006/0033457 | A1 | * | 2/2006 | Won et al. | 318/254 |

FOREIGN PATENT DOCUMENTS

DE 40 42 041 A1 7/1992

WO 02/06076 A1 1/2002

OTHER PUBLICATIONS

"Evaluation Of Encoderless Vector Control Techniques For Induction Motor Drives" by Mark Sumner, Ben Conroy and Tom Alexander, from Dept. of Electronical Engineering, U of Nottingham, Nottingham, United Kingdom, pp. 315-320.

(Continued)

Primary Examiner—Bentsu Ro
Assistant Examiner—David S Luo
(74) Attorney, Agent, or Firm—Vidas, Arrett & Steinkraus, P.A.

(57) ABSTRACT

A method for the no-transmitter speed determination of an asynchronous machine, comprising the steps which follow: a module for field-oriented regulation calculates the voltages to be applied to the asynchronous machine on the basis of a setpoint for the speed, at least two values measured for the conductor current, and a speed calculated by an observer module, the observer module has applied thereto the voltage values obtained from the field-oriented regulation or the voltage values measured, and calculates a value of the moment-forming current îsq(t) and an inner moment Mi(t) of the asynchronous machine from the values applied, a moment module calculates a load moment Ml(t) acting upon the asynchronous machine from the difference of the moment-forming currents from the field-oriented regulation and the observer module, a speed module calculates the actual speed of the asynchronous machine via the load moment of the moment module and the inner moment of the observer module.

10 Claims, 1 Drawing Sheet

OTHER PUBLICATIONS

"Anti-slip-re-adhesion control based on speed sensor-less vector control and disburbance observer for electric multiple units, -Series 205-5000 of East Japan Railway Company", by Hata et al, published in ICIT 2003, Maribor, Slovenia, pp. 772-777.

"Sensorless Speed and Position Control of Induction Motors" by Holtz, from 27th Annual Conf of the IEEE Industrial Electronics Society, IECON Denver, CO, 2001.

* cited by examiner

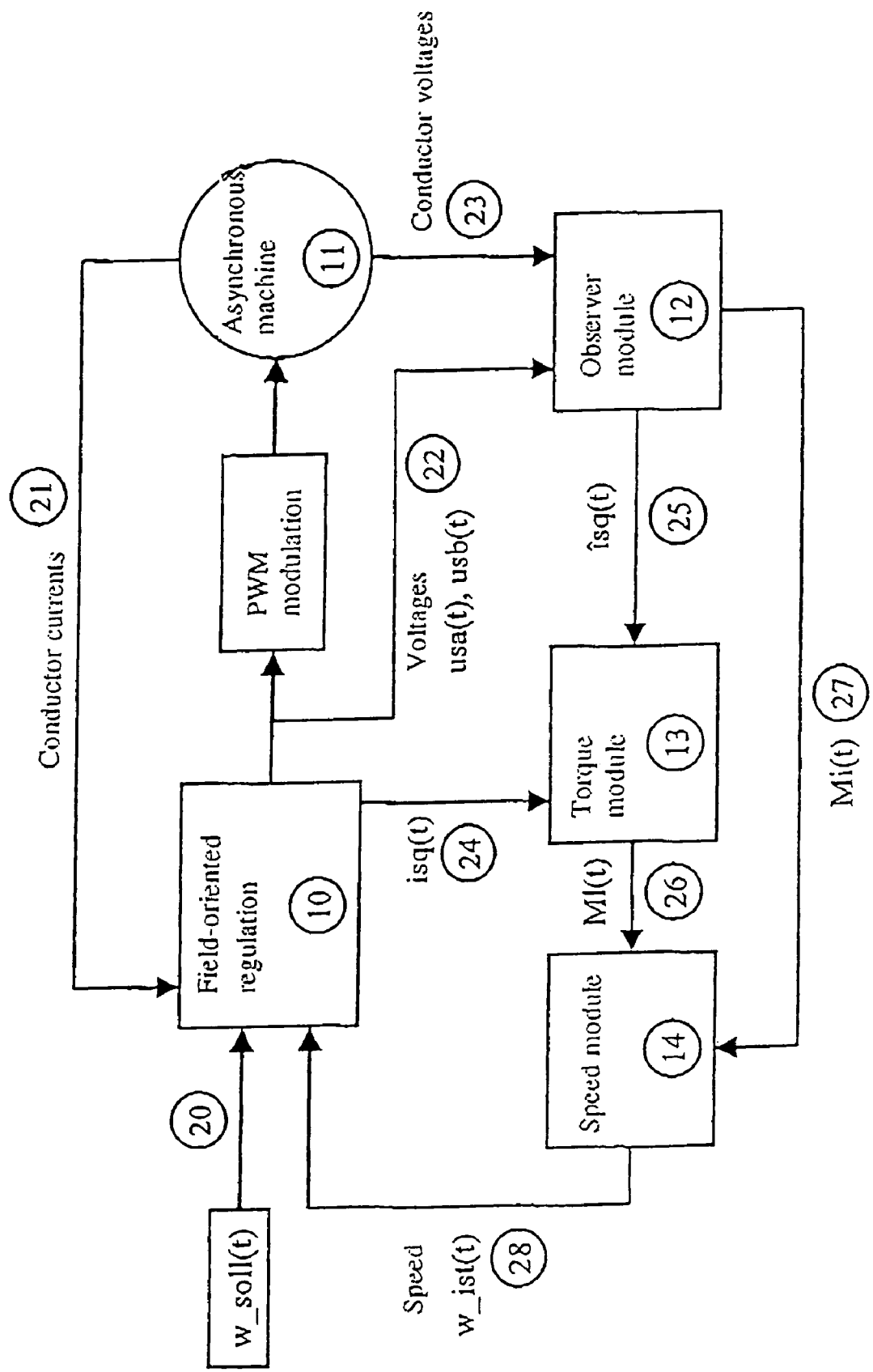

METHOD FOR THE NO-TRANSMITTER SPEED DETERMINATION OF AN ASYNCHRONOUS MACHINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for the no-transmitter speed determination of an asynchronous machine, specifically for industrial trucks.

An industrial truck with a direct-current motor of a series circuit design without additional sensors for speed detection is known from DE 4042041 A1, the entire contents of which is incorporated hereby in reference in its entirety.

Asynchronous or synchronous motors stand out because of their no-maintenance and rugged technical equipment over direct-current motors. Moreover, asynchronous machines enjoy a comparative simple regulation.

WO 02/06076 A2, the entire contents of which is incorporated hereby in reference in its entirety, has made known a method for a sensorless drive regulation of an electric vehicle in which the stator current is determined depending on the actual values detected for a flux concatenation, the torque, and the conductor currents measured. For a determination of flux concatenation, a motor model is used which determines the speed and torque.

A tutorial by Joachim Holtz entitled "Sensorless Speed and Position Control of Induction Motors", the entire contents of which is incorporated hereby in reference in its entirety, has become known from the meeting volume of the 27$^{th}$ Annual Conference of the IEEE Industrial Electronic Society, IECON, held in Denver, Colo., from Nov. 27 to Dec. 2, 2001. The tutorial presents a series of models which allow to calculate speeds without any speed detection. In particular, a difference is made between fed-back and non-fed-back observers for the magnetic flux.

It is the object of the invention to provide a regulation for an asynchronous machine that dispenses with using a speed sensor or incremental transmitter while permitting a rugged and simple regulation.

BRIEF SUMMARY OF THE INVENTION

The inventive method uses the field-oriented regulation to trigger the asynchronous machine. The input magnitude is a predetermined speed for the asynchronous machine where the setpoint for the speed, for example, is determined by a travel transmitter of an industrial truck. Apart from the setpoint for speed, the module for field-oriented regulation has applied thereto two values measured for the conductor current as well as a speed calculated by an observer module. Using magnitudes provided by the field-oriented regulation, the observer module calculates a value for the speed that is sent, as an actual value, on to the field-oriented regulation. According to the invention, the observer module has applied thereto values of the moment-forming current indicator îsq(t) and the voltages usa(t) and usb(t) from the field-oriented regulation. Alternatively, the conductor voltages measured for the asynchronous machine may be applied as well. The field-oriented regulation may utilize the vector size, i.e. the length and direction, of the moment-forming current. In the inventive method, a moment module, e.g. by iteration, calculates a value of the load moment Ml(t) acting on the machine from the actual difference of the moment-forming current îsq(t) of the observer module and the moment-forming current îsq(t) of the field-oriented regulation. Proceeding from a start value, the moment module calculates the complete allowed value of the load moment for the speed module from the difference of those current values.

The invention relies on the discovery that not a single value explicitly indicates the internal moment or load moment in the field-oriented regulation which is known per sé. The load moment and internal moment are merely known implicitly by the moment-forming current indicator îsq(t), the structure of the equation system, and the input magnitudes.

Based on the voltage values, field-oriented regulation usa(t) and usb(t) or conductor voltages measured, the observer module calculates the internal moment of the asynchronous machine which is triggered. The moment module determines the load moment acting on the machine from the difference of the moment-forming currents where the error rate is minimized iteratively so that the system of field-oriented regulation and the observer system are tuned to each other. Those values of the moments are used by the inventive method to iteratively calculate the speed therefrom in the speed module and apply it to the field-oriented regulation. During iteration, the speed which was determined converges against its real value.

The inventive method provides the advantage to provide a correct value of the speed throughout the speed range in a highly dynamic fashion.

BRIEF DESCRIPTION OF THE SEVERAL VIEWS OF THE DRAWINGS

The inventive method will be described in more detail below with reference to an embodiment.

FIG. 1 is a schematic block diagram of the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

FIG. 1, in a schematic block diagram, shows a field-oriented regulation 10 the output values of which represent the pulse-width modulated voltages 22 of the asynchronous machine 11. The input magnitudes of the field-oriented regulation 10 are constituted by the speed setpoint ω_soll 20 and the actual speed value 28 designated by ω_ist. Further, two measured conductor currents 21 of the asynchronous machine 11 are applied to the field-oriented regulation 10.

The speed setpoint is calculated by three modules 12, 13, and 14. Module 12 represents an observer module which uses the voltage values usa(t) and usb(t) determined by the field-oriented regulation 10 for triggering the asynchronous machine 11 or the measured conductor voltages 23 to calculate a model of the machine.

In the field-oriented regulation 10, the indicator of the moment-forming current îsq(t) is adapted directly to the real moment required via a controller. Using the value 24, the field-oriented regulation 10 transfers the moment-forming current indicator îsq(t) to the moment module 13. Further-more, the moment module 13 is given the moment-forming current îsq(t) calculated by the observer module, via the value 25. The difference of those two current indicators is utilized by the moment module 13 to determine the load moment Ml(t) 26 which acts on the asynchronous machine.

Module 14 represents a speed module. The input magnitudes define the load moment Ml(t) 26 as determined by the moment module 13 and the internal moment (Mi(r) 27 as ascertained by the observer module 12. Those values help the speed module 14 in calculating the actual speed $\omega\_ist$ (t) 28 of the asynchronous machine therefrom, which is fed to the field-oriented regulation 10.

As a result, the difference of the moment-forming currents of the field-oriented regulation 10 and observer module 12 is minimized and, thus, those two systems are tuned to each other. At this time, the calculated speed $\omega\_ist$ (t) 28 will converge against the real value can be employed to regulate the asynchronous machine.

The method described for the no-transmitter speed determination for an asynchronous machine may be extended to improve the dynamic properties under real conditions.

The moment module 13 may be realized by an adaptive PI controller. At this stage, the controller gains are modified as being proportional to an adaptation magnitude. The electric input power P(t), as calculated from the magnitudes of the field-oriented regulation 10, or the speed rule deviation $\omega\_soll$ (t)–$\omega\_ist$(t) may be used as adaptation magnitudes. Thus, high input powers and large deviations from rules, respectively, lead to large controller gains and, hence, result in a larger weighting of the difference to be minimized between the moment-forming flux îsq(t) of the field-oriented regulation 10 and that of the observer module 12 îsq(t).

The calculation of the actual speed of the asynchronous machine via the moments determined by the observer module 12 and moment module 13 (internal moment Mi(t) 27 and load moment Mi(t) 26 requires to know the mass inertia of the overall system. Such inertia is unknown and is variable, as a rule. The electric input power P(t) and the speed rule difference $\omega\_soll$ (t)–$\omega\_ist$(t) make it appreciable how fast the vehicle obeys the predetermined speed setpoint. This fact allows to conclude what the mass inertia of the vehicle is, and take it into account in calculating the speed in the speed module 14.

When passing through the zero speed as occurs during a change of the direction of travel transient oscillation processes become obvious mainly in the rotor magnetic flux as calculated by the observer module 12, which can result in oscillations in the speed 28 which was determined. The run of the rotor magnetic flux in time may be smoothened and, thus, oscillations can be clearly reduced by varying the main inductance of the asynchronous machine 11 that is used for the calculations in the observer module 12. In particular, a reduction in main inductance at high slip frequencies has a positive effect on the driving performance.

When the vehicle is driven on slopes and the direction of travel is changed at small speed setpoints 20 there might possibly be a case that the rotating field which is generated by the field-oriented regulation 10 sticks to very small frequencies, which causes the vehicle to respond no longer to predetermined setpoints and come to a stop. This behaviour is due to using the calculated speed 28. This undesirable adherence behaviour of the field-oriented regulation 10 is eliminated by zeroing the predetermined load moment Ml(t) for a short time. If such a condition is found to exist via an evaluation of the driving signals for the asynchronous machine a controlled return to the operating condition may be achieved by resetting the moment module 13 for a certain period of time. During this time, the speed module 14 will continue to operate with the zero load moment.

The transition of the system described to generator-type operation from motor-type operation may be made easier by increasing the amount of the calculated speed 28 by some per cent as long as the effective power as calculated from the measured conductor currents 21 and measured conductor voltages 23 is negative already (generator-type operation), but the field-oriented regulation 10 is still working in the motor-type operation at the same time. It is possible to determine the actual mode of opertion of the regulation 10 by an evaluation of the signs of the speed 28 and slip frequency.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the no-transmitter speed determination of an asynchronous machine, comprising the steps which follow: a module (10) for field-oriented regulation calculates the voltages (22) to be applied to the asynchronous machine (11) on the basis of a setpoint for the speed (20), at least two values measured for the conductor current (21), and a speed (28) calculated by an observer module (12), the observer module (12) has applied thereto the voltage values (22) obtained from the field-oriented regulation (10) or the voltage values measured (23), and calculates a value of the moment-forming current îsq(t) (25) and an inner moment Mi(t) (27) of the asynchronous machine from the values applied, a moment module (13) calculates a load moment Ml(t) (26) acting upon the asynchronous machine (11) from the difference of the moment-forming currents from the field-oriented regulation (10) and the observer module (12), a speed module (14) calculates the actual speed (28) of the asynchronous machine via the load moment (26) of the moment module (13) and the inner moment (27) of the observer module (12), and further characterized in that the setpoint for the speed (20) is given by a travel transmitter.

2. The method according to claim 1, characterized in that the speed calculated for field-oriented regulation is transferred as an actual speed of the asynchronous machine.

3. The method according to claim 1, characterized in that the main inductance of the asynchronous machine set for the calculations in the observer module (12) is varied in time to attenuate oscillations of the magnetic rotor flux calculated by the observer module (12).

4. The method according to claim 1, characterized in that if the field-oriented regulation (10) undesirably keeps using small rotating-field frequencies the load moment Ml(t) (26) imposed on the speed module (14) for a time interval is set to zero to return to a preset operating condition.

5. The method according to claim 1, characterized in that the moment module (13) is designed as an adaptive PI controller wherein the controller gains are varied via the electric power input or speed deviation.

6. The method according to claim 1, characterized in that if the speed (28) is to be calculated in the speed module (14) the mass inertia of the vehicle is varied by means of the electric power input or speed control deviation.

7. The method according to claim 1, characterized in that a transition of the regulator-and-observer system to a generator-type operational mode is facilitated by increasing the amount of the speed (28) transferred to the field-oriented regulation (10) as long as the effective power calculated from the conductor currents measured (21) and the conductor voltages measured (23) is negative while the regulation (10) still is in a motor-type operational mode.

8. The method according to claim 1, characterized in that the asynchronous machine (11) serves for driving an industrial truck.

9. A method for the no-transmitter speed determination of an asynchronous machine, comprising the steps which follow: a module (10) for field-oriented regulation calculates the voltages (22) to be applied to the asynchronous machine (11) on the basis of a setpoint for the speed (20), at least two values measured for the conductor current (21), and a speed (28) calculated by an observer module (12), the observer module (12) has applied thereto the voltage values (22) obtained from the field-oriented regulation (10) or the voltage values measured (23), and calculates a value of the moment-forming current îsq(t) (25) and an inner moment Mi(t) (27) of the asynchronous machine from the values applied, a moment module (13) calculates a load moment Ml(t) (26) acting upon the asynchronous machine (11) from the difference of the moment-forming currents from the field-oriented regulation (10) and the observer module (12), a speed module (14) calculates the actual speed (28) of the asynchronous machine via the load moment (26) of the moment module (13) and the inner moment (27) of the observer module (12), and further characterized in that the moment module (13) determines the error rate to be zero or approximately zero.

10. A method for the no-transmitter speed determination of an asynchronous machine, comprising the steps which follow: a module (10) for field-oriented regulation calculates the voltages (22) to be applied to the asynchronous machine (11) on the basis of a setpoint for the speed (20), at least two values measured for the conductor current (21), and a speed (28) calculated by an observer module (12), the observer module (12) has applied thereto the voltage values (22) obtained from the field-oriented regulation (10) or the voltage values measured (23), and calculates a value of the moment-forming current îsq(t) (25) and an inner moment Mi(t) (27) of the asynchronous machine from the values applied, a moment module (13) calculates a load moment Ml(t) (26) acting upon the asynchronous machine (11) from the difference of the moment-forming currents from the field-oriented regulation (10) and the observer module (12), a speed module (14) calculates the actual speed (28) of the asynchronous machine via the load moment (26) of the moment module (13) and the inner moment (27) of the observer module (12). and further characterized in that the voltage values (22) of the field-oriented regulation (10) are applied to the observer module (12) in the fixed coordinate system of the stator or, if the measured voltage values (23) are used, those are purposefully transformed into fixed coordinates of the stator.

* * * * *